Nov. 21, 1961  M. V. WATERS ET AL  3,009,399
AUTOMATIC CYCLE CONTROL MECHANISM
Filed June 3, 1958  10 Sheets-Sheet 1
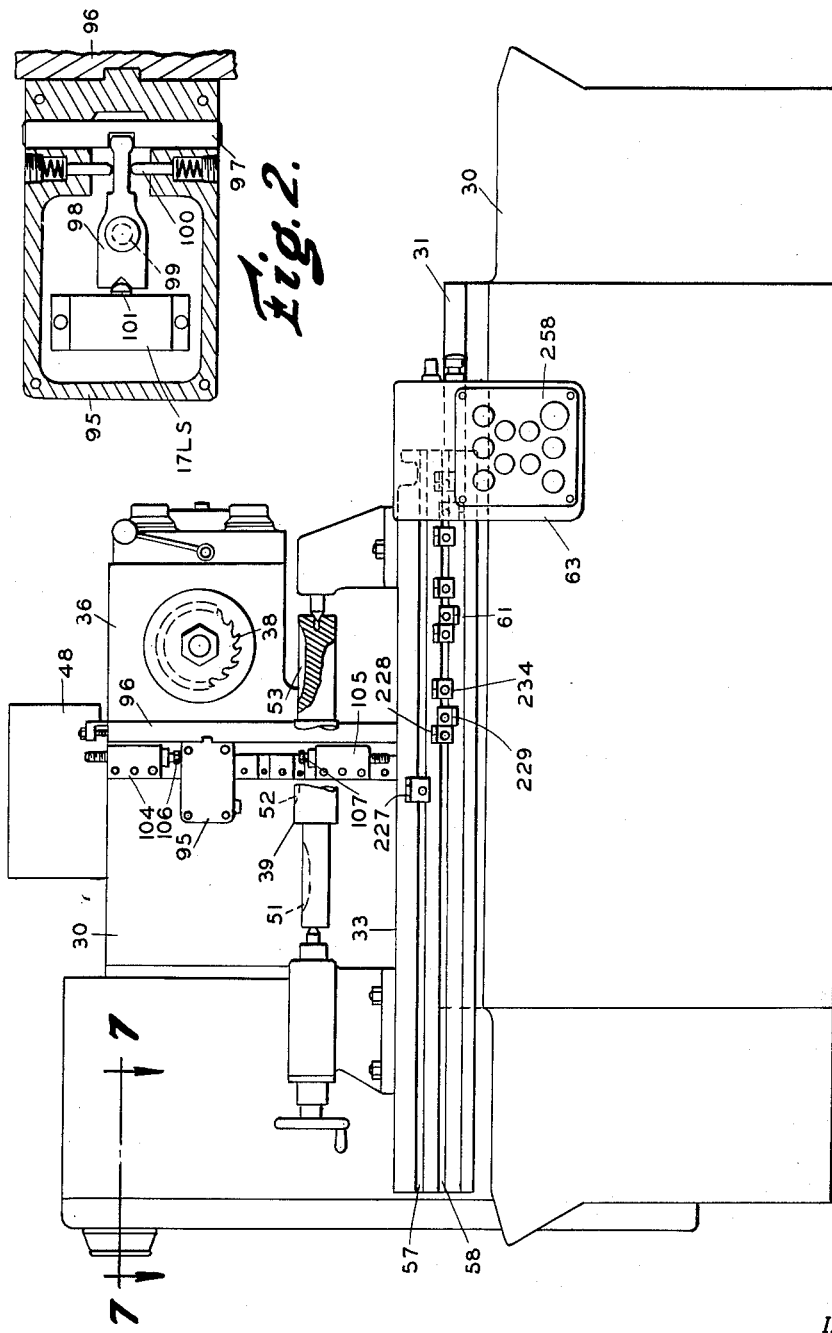
INVENTORS
MILTON V. WATERS
ALBERT V. GRESS, JR.
BY
Howard A Kiser
& John F. Verhoeven
ATTORNEYS

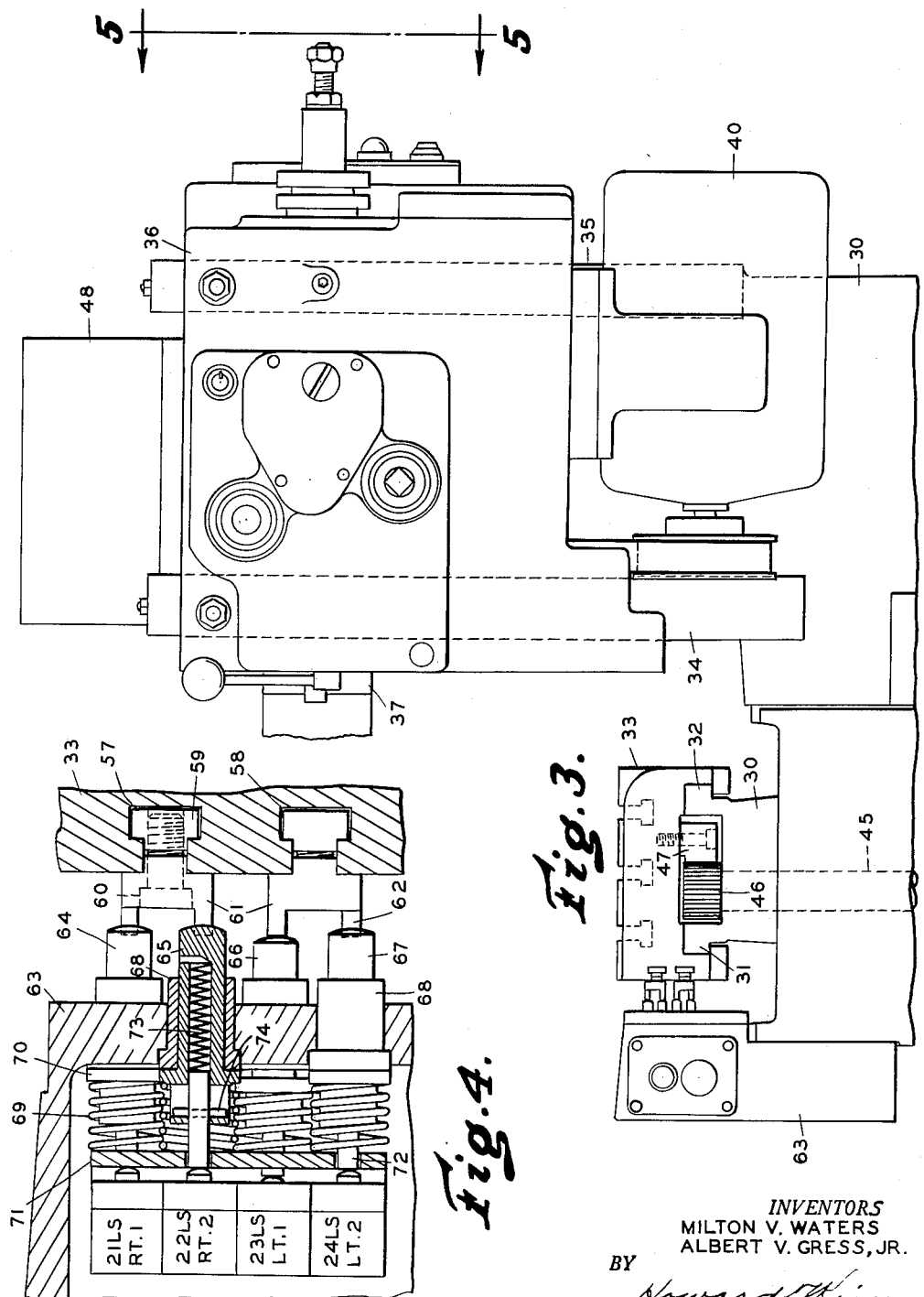

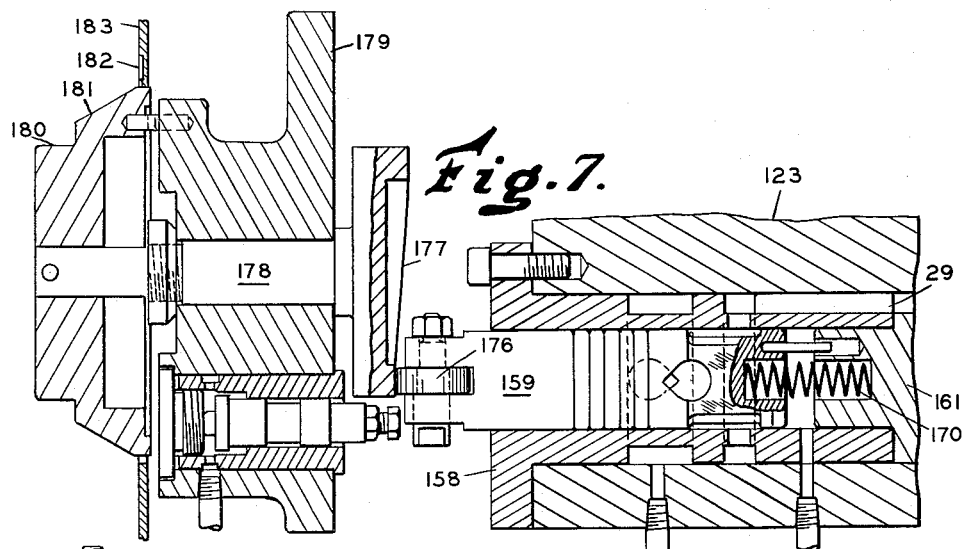
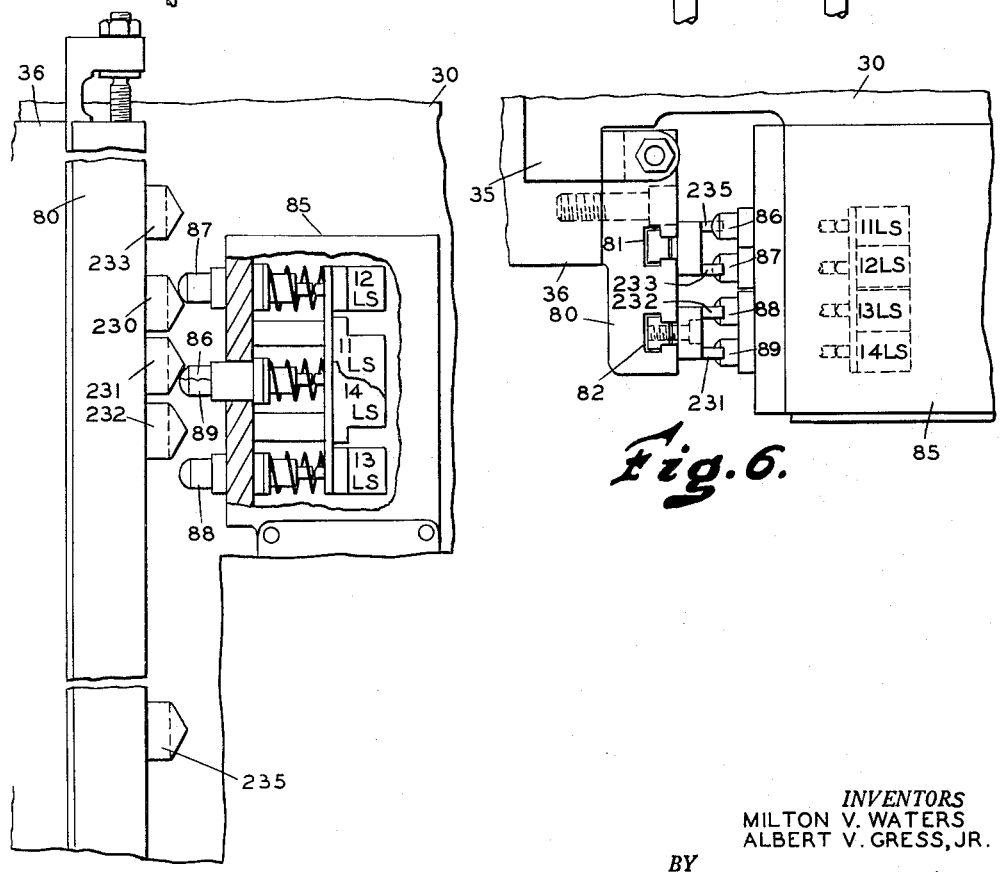

INVENTORS
MILTON V. WATERS
ALBERT V. GRESS, JR.
ATTORNEYS

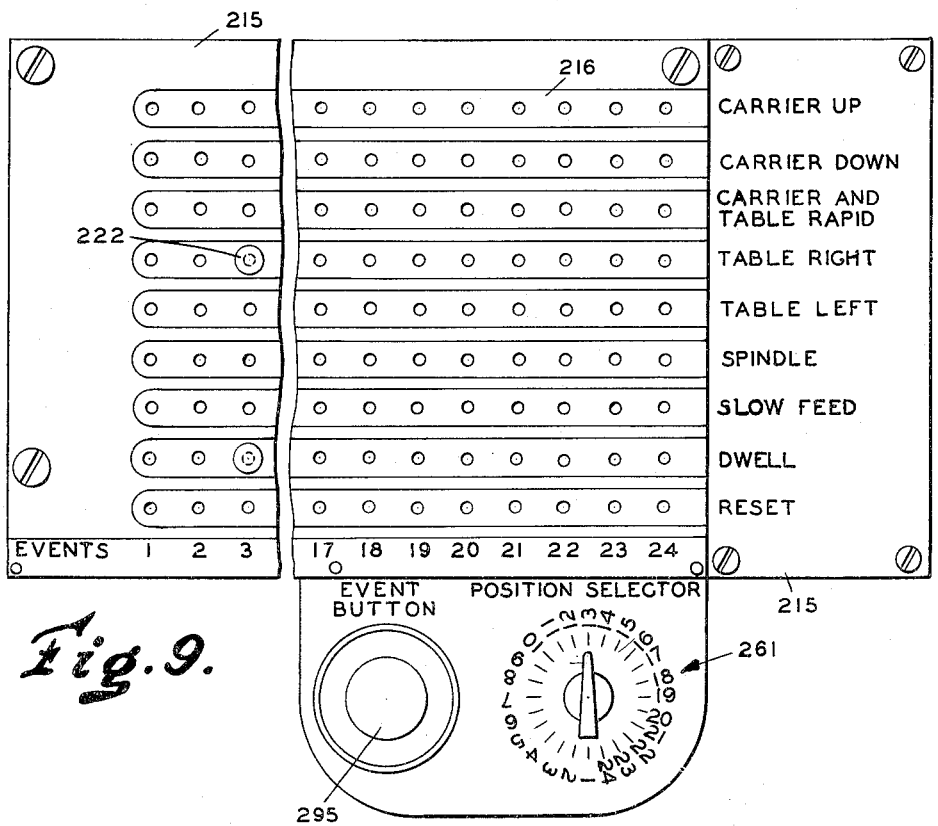
Fig. 9.
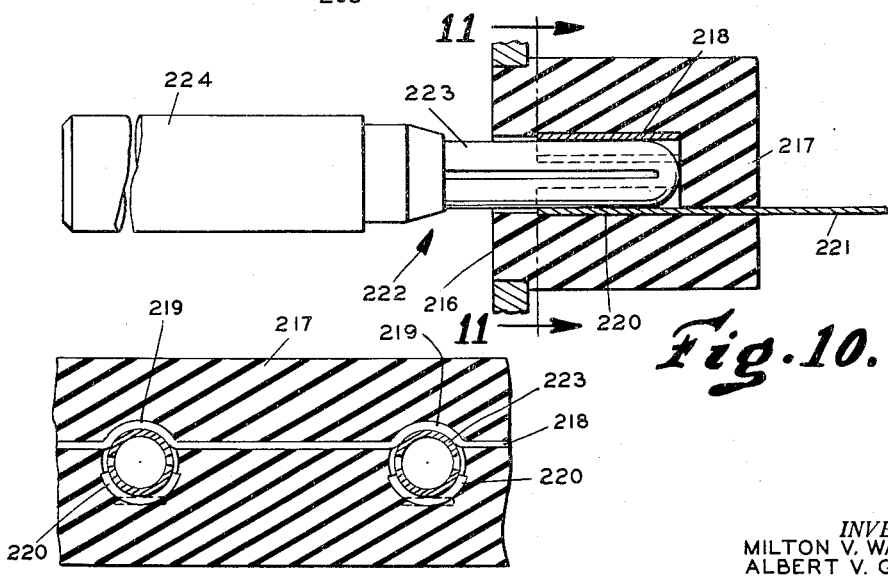
Fig. 10.
Fig. 11.

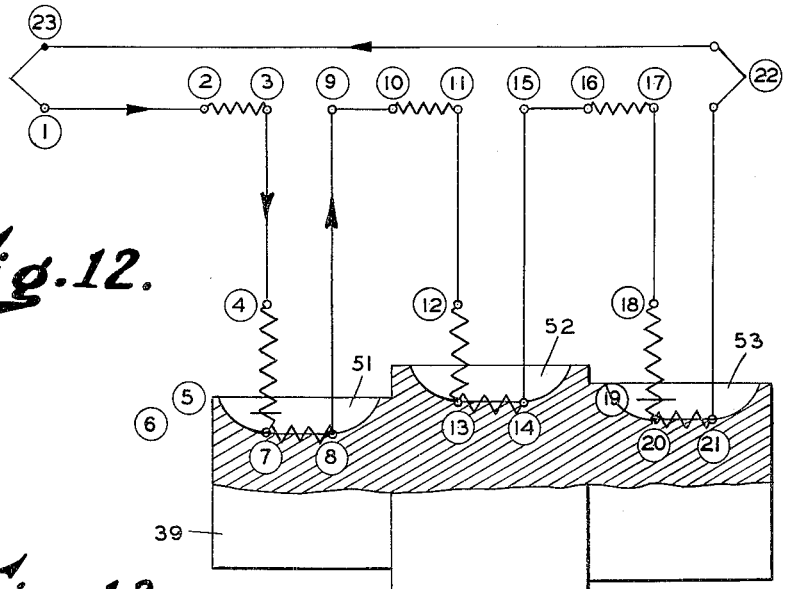
Fig. 12.
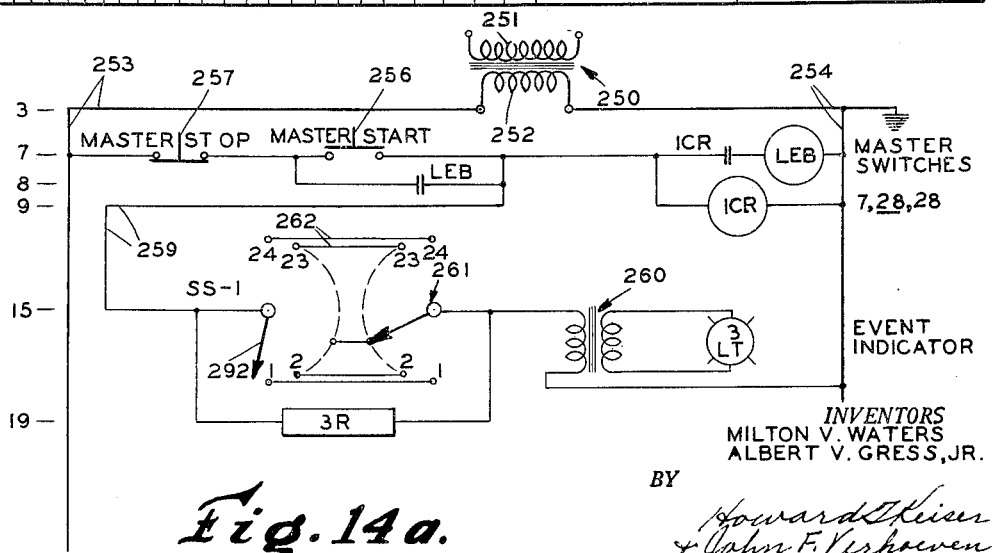
Fig. 13.
Fig. 14a.

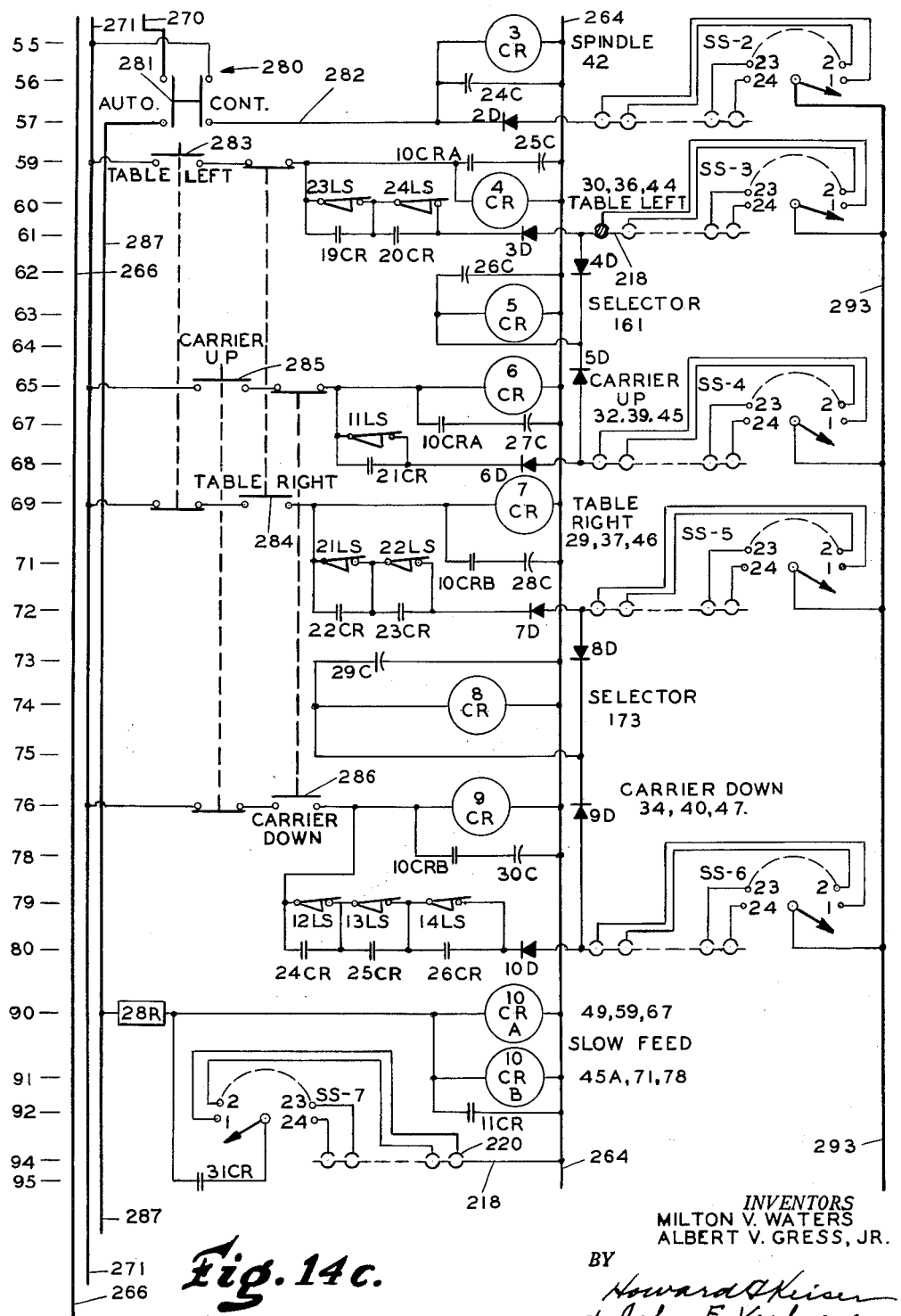

INVENTORS
MILTON V. WATERS
ALBERT V. GRESS, JR.
BY
Howard S Keiser
& John F. Verhoeven
ATTORNEYS

United States Patent Office 3,009,399
Patented Nov. 21, 1961

3,009,399
AUTOMATIC CYCLE CONTROL MECHANISM
Milton V. Waters, Silverton, and Albert V. Gress, Jr., Trotwood, Ohio, assignors, by direct and mesne assignments, to The Cincinnati Milling Machine Co., Cincinnati, Ohio, a corporation of Ohio
Filed June 3, 1958, Ser. No. 739,508
16 Claims. (Cl. 90—21)

This invention relates to an automatic cycle control mechanism for machine tools and the like, and more particularly, to a control mechanism employing dog operated switches for terminating one event in the cycle and initiating the next event. In setting up the automatic cycle, any desired sequence of events may be selected by merely inserting plugs in the proper holes of a program board. This type of control system has the advantage that it is possible to quickly and easily convert the machine from one type of automatic cycle to another in order to adapt the machine to the particular job to be performed. After the equipment has been set up to machine a particular part, the duties of the operator consist merely of unloading the finished part from the machine at the end of each cycle and replacing it with an unfinished part. After the new part is loaded in the machine, the automatic cycle is initiated by depressing a pushbutton whereupon the control mechanism, which forms the subject matter of the present invention, will assume control of the machine and guide it through a complete machining cycle in accordance with the positioning of the trip dogs on the machine tool slides and the arrangement of the plugs on the program board. This is, of course, a very generalized description of the operation of the present invention, and numerous other desirable features will become apparent from the detailed description to follow.

Accordingly, it is an object of the present invention to provide an improved automatic cycle control mechanism for determining the sequence of operations of a machine tool and for programming it through a complete machining cycle without the intervention of the operator.

Another object of the invention is to provide a novel control system involving dog operated limit switches, a stepping switch, and a program board to effect the sequential operation of the machine tool elements in the manner required to carry out a predetermined type of automatic machining operation.

Another object of the invention is to provide an automatic cycle control mechanism for a machine tool in which the cycle can be stopped at any desired point and restarted without disturbing the sequence of operation.

Another object of the invention is to provide means for automatically resetting the cycle control mechanism after the last event in any particular machining program.

Another object of the invention is to provide means for automatically resetting the cycle control mechanism when the machine is initially energized.

Another object of the invention is to provide means for automatically resetting the cycle control mechanism when the system is switched over from automatic control to manual control.

Another object of the invention is to provide a dwell function which can be programmed in conjunction with any of the other events in order to delay the initiation of the next event for a predetermined interval of time.

Another object of the invention is to provide means for programming an accurate stop of the slide in a predetermined position thereof.

Another object of the invention is to provide means for positively stopping a slide in a predetermined position with a high degree of accuracy at the conclusion of one of the preselected events.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

FIG. 1 is a front view of a milling machine to which the present invention is shown applied.

FIG. 2 is a cross sectional view of the positive stop device shown in FIG. 1.

FIG. 3 is a right hand end view of the machine shown in FIG. 1.

FIG. 4 is a cross sectional view of the table trip dogs and limit switch plungers shown in FIG. 3.

FIG. 5 is a rear view of the machine taken along the line 5—5 of FIG. 3 showing the limit switches associated with the trip dogs on the spindle carrier.

FIG. 6 is a top plan view of the structure shown in FIG. 5.

FIG. 7 is a cross sectional view of the feed rate control mechanism incorporated in the present machine.

FIGS. 9, 10 and 11 are views showing the program board.

FIG. 12 is a diagrammatic view of the machine cycle chosen to illustrate the operation of the apparatus.

FIG. 13 is a chart showing the setup of the program board for the cycle shown in FIG. 12.

Figure 8:
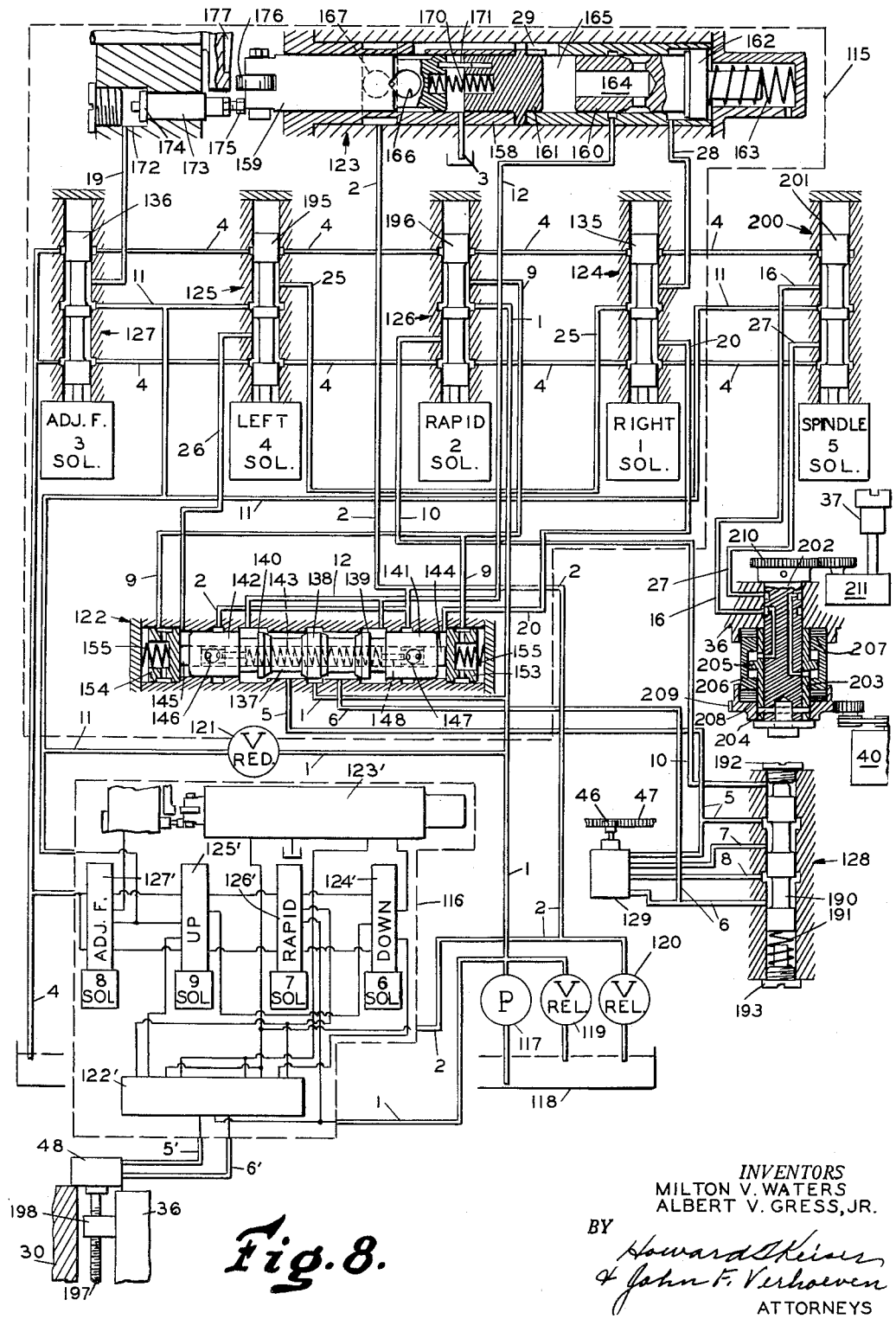
FIG. 8 is a hydraulic diagram for the milling machine shown in the preceding views.

FIGS. 14a to 14e, inclusive, are a wiring diagram of the electrical circuits incorporated in the automatic cycle control apparatus.

Machine tool

It will be understood in connection with the following description that similar reference characters designate similar or identical elements and portions throughout the specification and throughout the different views of the drawings. As used herein, the term "event" means any one of the successive operations performed by the machine tool during an automatic cycle. Thus, the cycle may be made up of a number of events which occur in successive order and each of which involves the performance of one or more functions of the machine tool. The term "function" is used to denote a particular operation performed by the machine tool such as, for example, table left, table right, carrier up, carrier down, slow feed, adjustable feed, rapid traverse, etc. Any particular function may be repeated several times during the cycle, that is, it may occur in several of the different events which make up the complete automatic cycle.

The present invention is shown applied to a horizontal milling machine having a bed 30 (FIGS. 1 and 3) on which the various elements of the machine tool are supported for movement as necessary in order to enable machining operations to be performed on a workpiece. For this purpose, the bed is provided with a pair of horizontally extending ways 31 and 32 (FIG. 3) on which a table 33 is supported for longitudinal sliding movement. The bed is also provided with a pair of vertically extending ways 34 and 35 on which a spindle carrier 36 is supported for vertical sliding movement. The spindle carrier is fitted with a spindle 37 on which is mounted a cutter 38 for machining a workpiece 39 supported on the table 33. The spindle and cutter are arranged to be driven by an electric motor 40 supported on the spindle carrier and connected to the spindle through a variable speed drive mechanism of conventional design housed within the spindle carrier.

Translation of the table 33 along the bed 30 is effected by a hydraluic motor which drives a shaft 45 to which is secured a pinion 46 meshing with a rack 47 bolted to the underside of the table.

Movement of the spindle carrier 36 up and down along the ways 34 and 35 on the bed is effected by a hydraulic motor 48 mounted on top of the bed and driving a vertical feed screw which meshes with a nut secured to the carrier. The speed and direction of rotation of the hydraulic motors is controlled by selectively operable valves as will hereinafter be more fully described. The spindle 37 is preferably provided with a quill-type mounting (not shown) to permit adjustment of the cutter in an axial direction.

In the example of work herein shown, the cutter 38 is a slotting type milling cutter which, in the present case, is used to cut three keyways 51, 52, and 53 in three different diameters of the shaft 39 which constitutes the workpiece to be machined. The table is shown in FIG. 1 in the position it occupies after the last keyway 53 has been cut and before the table has been rapid traversed to the right to its starting position in readiness for the next automatic machining cycle.

To machine the keyways in the shaft with the set-up shown in FIG. 1, it is necessary to position the work beneath the cutter, lower the cutter into the work, traverse the table through a distance equal to the length of the keyway, raise the cutter above the work, traverse the table to the next keyway, lower the cutter into the work, and so on, until the cutter reaches the position shown in FIG. 1. To accomplish this type of operation in a fully automatic manner, the table and carrier are provided with trip dogs which operate limit switches mounted on the bed and, through a sequencing type of control apparatus hereinafter to be described, cause automatic functioning of the table and carrier motors in the required manner to produce the finished part.

As shown in FIGS. 1, 3, and 4, the table is provided on its forward edge with T-slots 57 and 58 (FIG. 1) which receive nuts 59 (FIG. 4) into which are screwed clamping bolts 60. The bolts 60 are received in holes provided in trip dogs designated generally by reference numeral 61 and serve to adjustably secure the dogs on the forward edge of the table. Referring to FIG. 4, it will be observed that each trip dog is provided with a cam portion 62 which lies in the plane of a limit switch plunger mounted in a housing 63 fastened on the front of the bed 30. In the embodiment shown, there are four limit switches 21LS, 22LS, 23LS, and 24LS mounted within the housing and four plungers 64, 65, 66, and 67 each of which is operatively associated with one of the limit switches. Although not shown in FIG. 4, the plungers and limit switches may be disposed in a staggered arrangement so as to provide the necessary space for clearance between the plungers. Each plunger is received for sliding movement within a bushing 68 mounted in the housing 63 and each plunger is urged outwardly, or toward the right as viewed in FIG. 4, by a spring 69 compressed between a flange 70 on the plunger and a fixed frame plate 71 supported by the housing 63. Overdeflection of the limit switches by the plungers is prevented by a yielding connection formed between a stem 72 which bears against the limit switch button and the operating plunger. This stem is received for sliding movement within a bore provided in the plunger and is urged toward the left by a compression spring 73. The rear end of the plunger is slotted to receive a pin 74 which passes transversely through the stem 72. Normally, the pin 74 is held by spring 73 in engagement with the rear end of the slot as shown in FIG. 4, the spring 73 being strong enough to operate the limit switch when the plunger is depressed. However, if the plunger is overdeflected, the spring 73 will yield and prevent damage to the limit switch.

As will hereinafter be explained in connection with the wiring diagram, the limit switches 21LS and 22LS are utilized to control right hand movement of the table, while limit switches 23LS and 24LS are utilized to control left hand movement of the table.

A similar arrangement of trip dogs and limit switches is used to control the up and down movements of the spindle carrier 36. As shown in FIG. 6, a retaining plate 80 is bolted to the spindle carrier and provided with vertically extending T-slots 81 and 82 to provide means for adjustably securing the trip dogs to the carrier. Each trip dog is provided with a cam portion which lies in the plane of a cooperating limit switch plunger mounted in a housing 85 secured on the rear side of the bed 30. In the present machine, there are four limit switches, 11LS, 12LS, 13LS, and 14LS, and four plungers 86, 87, 88, and 89 for operating the limit switches when depressed by a trip dog. The plunger 86 and limit switch 11LS are used to control upward movement of the carrier, while the plungers 87, 88, and 89 and their associated limit switches 12LS, 13LS, and 14LS are used to control downward movement of the carrier. In FIG. 6, the carrier is shown moving downward with a dog 231 about to engage the plunger 89 and thereby operate the limit switch 14LS. Operation of the limit switch 14LS selects the next event in the cycle and may either cause the carrier to stop due to omission of a plug in the program board, or permit it to continue its downward movement until stopped by a dog 232 engaging the plunger 88 to operate limit switch 13LS, depending upon the type of operation for which the machine is programmed.

Movement of the carrier, either up or down, may also be limited by a positive stop provided on the front of the machine as shown in FIGS. 1 and 2. For this purpose, a stop bracket 95 is bolted and keyed to a retaining plate 96 secured to the spindle carrier 36. This bracket is bored to receive a plunger 97 (FIG. 2) the ends of which project a short distance above and below the top and bottom faces of the bracket. The plunger is notched midway of its length to receive the end of an operating lever 98 pivoted on a stud 99 mounted in the bracket. A pair of spring-pressed pins 100 engage on opposite sides of the lever 98 between the pivot stud 99 and the plunger 97 to hold the plunger in its centered position as shown in FIG. 2. The rear end of the lever is provided with a V-notch in which is received the end of the operating plunger 101 of a limit switch 17LS mounted within the bracket 95.

Bolted to the bed 30 above and below the bracket 95 is a pair of brackets 104 and 105, each of which is threaded to receive a stop screw 106 and 107. The stop screws are preferably provided with a micrometer adjustment for permitting very accurate adjustment of the setting thereof. The screws serve as abutment stops for the carrier through engagement thereof with the bracket 95 and, by virtue of the micrometer adjustment of the screws, there is provided a very accurate means for locating the upper and lower limits of movement of the spindle carrier. The screws 106 and 107 also serve to engage the protruding ends of plunger 97 and thereby actuate the limit switch 17LS which trips the automatic cycle control mechanism and advances it to the next event.

In the example of work herein shown, the above-described device for positively stopping the carrier in a precise position is not required but may be found useful or necessary in connection with other types of automatic machining cycles.

*Hydraulic diagram*

The hydraulic diagram for the machine tool is shown in FIG. 8. There are two main groups of valves employed in the hydraulic circuit, one of which is enclosed within the dotted outline 115 and serves to control the movement of the table 33, and the other of which is enclosed within the dotted outline 116 and serves to control the movement of the carrier 36. Since the two groups of valves are identical in all respects, only the table group 115 has been shown in detail and will be so described, it being understood that the same considerations apply to the valves of group 116 which control the carrier.

The valves of both groups are supplied with fluid under pressure by a motor driven pump 117 which withdraws fluid from a reservoir 118 and delivers it to a main pressure line 1. A relief valve 119 is connected to the discharge side of the pump and serves to maintain the pressure in line 1 constant, the excess fluid being returned to the reservoir. Spent fluid is returned to the reservoir through a main exhaust line 2 which is maintained at a predetermined low pressure by a relief valve 120. A pilot pressure line 11 is supplied with fluid at a reduced pressure by a pressure reducing valve 121 which is connected between the main pressure line and the pilot pressure line 11. The spent fluid from the pilot line is returned to the reservoir 118 through a pilot exhaust line 4.

The group of valves for controlling table movement includes a traverse valve 122, a rate valve 123, and four solenoid valves comprising a valve 124 operated by a solenoid 1SOL for feeding the table to the right, a valve 125 operated by a solenoid 4SOL for feeding the table to the left, a valve 126 operated by a solenoid 2SOL for moving the table in rapid traverse, and a valve 127 operated by a solenoid 3SOL for selecting adjustable feed of the table.

The aforementioned valves, together with a high speed, low speed valve 128, control the operation of a hydraulic motor 129 which drives the spur gear 46 (see also FIG. 3) meshing with the rack 47 secured to the underside of the table. Hence, by appropriate energization of solenoids 1SOL-4SOL, inclusive, the table may be traversed either to the right or to the left, and such movement may be effected either at a slow feed rate when solenoid 3SOL is deenergized as shown in FIG. 8, or at an adjustable feed rate when this solenoid is energized. Rapid traversing movement of the table may be effected by energizing solenoid 2SOL with solenoids 1SOL or 4SOL. Solenoid 2SOL, when energized, actuates valve 126 which bypasses the rate valve 123 and pilots the valve 122 to effect high speed operation of the motor 129. The table control valves are shown in FIG. 8 in their inactive positions, or in other words, in the positions which they occupy when the table is at rest. To move the table to the right at a selected feed rate, the solenoids 1SOL and 3SOL are energized, thereby moving spools 135 and 136 of valves 124 and 127, respectively, upward as viewed in FIG. 8. Valve 124 will thereby be conditioned to connect a line 25 with a line 20, the latter line being connected to a port on the right hand end of the traverse valve 122. Line 25 is connected to a port on valve 125 which port is in communication with a port connected to the pilot pressure line 11 when the solenoid 4SOL is deenergized as shown in FIG. 8. Hence, pilot pressure will be applied through line 20 to the right hand end of a spool 137 fitted for sliding movement in the traverse valve 122. The spool 137 is formed with a central land 138, a pair of intermediate lands 139 and 140, and a pair of end lands 141 and 142. The spool 137 is also formed with a longitudinally extending bore within which is received a compression spring 143 acting on plungers 144 and 145 mounted for sliding movement in each end of the bore in the spool. Each plunger carries a radially extending pin 146 which projects into a radial hole 147 drilled in the spool 137 and intersecting with the longitudinally extending bore. The compression spring 143 urges the plungers outward to the extent permitted by the pins 146 which engage with the sides of holes 147 as shown in FIG. 8, and thereby limit the outward movement of the plungers 144 and 145.

The inner end of each plunger is provided with a drilled hole 148 extending longitudinally of the plunger and intersecting with a radially extending hole that communicates with the hole 147. The central portion of the bore, which receives the spring 143, is thereby maintained in communication with the holes 147 and prevents a buildup of pressure between the plungers so that the only outward force acting on the plungers is that of the spring 143.

The outer ends of the plungers 144 and 145 extend beyond the ends of the spool when the latter is in its centered position as shown in FIG. 8 and contact the end faces of a pair of cup-shaped pistons 153 and 154 disposed in each end of the valve 122. Each piston is somewhat larger in diameter than the lands on the spool 137 and is urged inwardly by a spring 155 compressed between the ends of the valve and the piston so as to maintain the inner end of the piston up against a limit stop. This stop takes the form of a shoulder formed in the valve bore by the end of a counterbore provided in each end of the valve to suit the larger diameter of the pistons 153 and 154. Each piston is provided with an annular groove extending therearound which is ported to the interior of the piston. The groove on each piston is adapted to communicate in all positions of the piston with a port in the valve 122 to which a line 9 is connected. When the solenoid 2SOL for the rapid valve 126 is deenergized, the line 9 is communicatively connected by ports on the valve 126 with the main pressure line 1 of the system. Hence, in ordinary table feeding operations, the pistons 153 and 154 are held firmly against the limit shoulders in valve 122 by the high pressure applied behind them through the line 9.

It will now be appreciated that when the pilot pressure is admitted to the right hand end of the valve 122 through the line 20, as earlier described, the spool 137 will be moved to the left until the left hand end of the spool abuts against the end face of piston 154 which acts as a positive stop for the spool. The plunger 145, of course, is moved inwardly against the urgency of the spring 143 and the pin 146 in the plunger moves over to the opposite side of the hole 147.

When the spool 137 is in this position, the center port of the valve 122, to which the main pressure line 1 is connected, is uncovered by the central land 138 and placed in communication with the right hand motor port of the valve to which a line 6 is connected. Also, the land 140 will uncover a port to which a line 12 is connected, thereby placing the line 12 in communication with a line 5 connected to the left hand motor port of the valve 122. Hence, fluid will flow from the line 1 into line 6, thence through the hydraulic motor 129 and return through line 5 to line 12. The latter line is connected to a port on the right hand end of the rate valve 123.

The rate valve includes a ported sleeve 158 which fits snugly into the body of the valve and which is bored to receive a rate valve plunger 159 and a blocking piston 160. The plunger and piston are separated by a plug 161 which is held against movement within the sleeve and which effectively divides the same into two separate cylinders, a left hand cylinder receiving the rate valve plunger 159 and a right hand cylinder receiving the blocking piston 160.

The piston 160 is provided at its right hand end with a land 162 of increased diameter which is received in a counterbore formed in the right hand end of the sleeve 158. The end of the counterbore serves as a stop to limit left hand movement of the piston within the sleeve. The piston is urged to the left by a compression spring 163 but is normally held in its right hand position as shown in FIG. 8 by pilot line pressure supplied through a line 28 to a port communicating with the counterbore in the sleeve 158 when solenoids 1SOL and 4SOL are deenergized. In this position of the piston, the valve port to which line 12 is connected, is sealed off by the piston so that no fluid can return through line 5 from the motor. Since the ports of valve 122 are underlapped, the pressure in motor lines 5 and 6 will build up to a point where it is equal to the pressure in the main pressure line 1. The table motor 129 will thereby be locked against rotation, and the table will be held firmly in a fixed position.

However, when solenoid 1SOL is energized and spool 135 of valve 124 is shifted upwardly, the line 28 will be disconnected from line 25, to which pilot line pressure is supplied, and will be connected to the pilot exhaust line 4. The spring 163 will then act to shift piston 160 to the left and connect line 12 to a groove in the piston which is connected by radial holes with an axial bore 164 which opens into a chamber 165 formed in the sleeve between the plug 161 and the piston 160. The chamber 165 is connected by a channel 29 formed in the sleeve 158 with a rate port 166 passing radially through the plunger 159. This port cooperates with a similar port 167 formed in the sleeve 158 which is communicatively connected with the main exhaust line 2.

The plunger 159 is urged to the left by a spring 170 and is held against rotation within the sleeve by a pin 171 mounted in the plunger and sliding in a hole provided therefor in the plug 161. The space between the plug and the plunger is drained by a line 3 leading to the reservoir.

In FIG. 8, the plunger 159 is shown in the position it occupies when solenoid 3SOL is deenergized which conditions the rate valve for slow feeding movement of the table. In this position of the valve, the spool 136 permits pilot pressure in line 11 to be communicated to a line 19 leading to the left hand end of a cylinder 172 in which is received an actuating plunger 173. The plunger 173 is thereby held by pilot pressure in its right hand position as shown in FIG. 8. Right hand movement of the plunger is limited by a land 174 on the plunger abutting against the end of a counterbore provided in the cylinder 172. In this position of the actuating plunger, the rate plunger 159 of the rate valve is held to the right against the urgency of spring 170 by the head of an adjusting screw 175 mounted in the right hand end of the actuating plunger 173. The overlap of the rate ports 166 and 167 is thereby reduced to an extent determined by the setting of the adjusting screw 175 so as to provide the necessary restriction to the return flow of fluid from the motor 129 through the lines 5 and 12, channel 29, rate ports 166 and 167 and exhaust line 2 to reservoir.

When solenoid 3SOL is energized, the line 19 is connected to pilot exhaust line 4 thereby permitting spring 170 to move plunger 159 to the left until a roll 176 carried by the plunger 159 contacts a feed rate cam 177, which determines the overlap of the rate ports 166 and 167. The setting of the cam 177 thereby determines the feed rate of the table which may be adjusted to the desired value by rotation of the cam.

As shown in FIG. 7, the cam is mounted on the right hand end of a shaft 178 which is journaled for rotation in a frame bracket 179. A hand wheel 180, secured to the left hand end of the shaft, is provided with a dial 181 which may be graduated to indicate the feed rate of the table in inches per minute. The dial graduations cooperate with an index 182 inscribed on a cover 183 having a suitable aperture provided therein for receiving the hand wheel.

The speed regulating valve 128 (FIG. 8) for controlling low speed or high speed of the table drive motor contains a spool 190 which is urged upwardly by a spring 191 to maintatin a tenon formed on the upper end thereof in contact with a plug 192 closing the upper end of the valve. When the spool is in this position, the grooves thereof are positioned to connect lines 5 and 7 and lines 6 and 8. Hence, fluid will flow into the motor through the dual lines 6 and 8 and will flow out of the motor through the dual lines 5 and 7. The construction of the motor is such that when fluid is delivered to the motor and exhausted therefrom through the dual lines, the motor will operate at high capacity and low speed.

When pilot pressure is applied to a line 10, the spool 190 will be moved down until the bottom of the spool contacts a tenon formed on the bottom closure plug 193. In this position of the spool, line 7 is cut off from line 5, and line 8 is cut off from line 6. Accordingly, fluid will now be delivered to the motor through the single line 6 and returned from the motor through the single line 5. With this connection, the motor will operate at low capacity and high speed.

Assuming now that the table is to be moved to the left instead of to the right, solenoid 4SOL is energized thereby moving a spool 195 in the valve 125 upwardly as viewed in FIG. 8. The pilot pressure line 11 is thereby disconnected from the line 25 and connected to a line 26. Pilot pressure will then be applied behind the left hand end of spool 137 of traverse valve 122, and the spool will be shifted to the right, the spring 143 yielding to permit plunger 144 to retract within the spool. When the right hand end of the spool contacts the end face of piston 153, the spool will be stopped, and fluid from the main pressure line 1 will now flow through line 5 to the motor 129 and return through line 6 which is now connected through valve 122 with the line 12.

Upward movement of spool 195 of valve 125 will also cause line 25 to be connected to the pilot exhaust line 4. Since solenoid 1SOL is now deenergized, line 25 will be connected by valve 124 with the line 28, and the blocking piston 160 will be moved to the left by spring 163. Thereby, line 12 will be communicatively connected with the rate ports 166 and 167 through channel 29, and the hydraulic fluid will flow through the restrictions presented by the ports and then out through the main exhaust line 2. If solenoid 3SOL is deenergized at this time, the plunger 173 will be in the position shown in FIG. 8, and the table will move to the right at a predetermined slow feed rate. If solenoid 3SOL is energized, the plunger of the rate valve will be moved to the left by spring 170, and the feed rate of the table will correspond to the setting of the cam 177.

Rapid traverse of the table may be selected in either direction of table movement by energization of solenoid 2SOL to move a spool 196 in valve 126 upward as viewed in FIG. 8. The line 9 will thereupon be connected to the pilot exhaust line 4, and line 10 will be connected to the main pressure line 1. Accordingly, the speed selector valve 128 will be moved down to condition the motor 129 for high speed operation, and the pressure behind pistons 153 and 154 will be released. The spool 137 of the traverse valve 122 will thereby be free to move all the way to the right or left, the springs 155 being compressed due to the pilot pressure applied through lines 20 or 26 to the opposite end of the spool. The spool will thereby uncover one or the other of the ports on the valve to which the main exhaust line 2 is connected and the line 12 will be by-passed. Hence, return fluid from the motor 129 will flow directly into the exhaust line 2 without passing through the rate valve. The motor will thereby operate at a predetermined high speed and cause the table to be moved in rapid traverse, either to the right or to the left, depending on whether solenoid 1SOL or 4SOL is energized in connection with solenoid 2SOL.

The group of valves shown diagrammatically in the lower portion of FIG. 8, control the up and down movement of the carrier in the same manner as the valves just described control the movement of the table. The same reference numerals will be used to identify corresponding valves and lines in both groups, but the numbers used in connection with the carrier control valve group are primed to distinguish them from the numbers used for the table control valve group.

The hydraulic motor 48 which feeds the carrier up and down differs from the table motor 129 in that it is a single speed motor only, and the lines 5′ and 6′ connected to the motor ports of the traverse valve 122′ lead directly to the motor without the interposition of any further valving. The drive from the motor to the carrier may include a lead screw 197 meshing with a nut 198 secured to the carrier 36.

The group of valves for controlling the carrier includes a traverse valve 122' which determines the up or down movement of the carrier, either at a feed rate or in rapid traverse. This valve corresponds in all respects to the valve 122 previously described, and the connections thereto are also identical with those to the valve 122. The feed rate of the carrier is controlled by a rate valve 123' which is identical with the rate valve 123 previously described. A solenoid 6SOL is adapted to actuate a valve 124' which determines the downward movement of the carrier, and this valve corresponds to the "Right" valve 124 operated by the solenoid 1SOL. A solenoid 9SOL is adapted to operate a valve 125' which determines the upward movement of the carrier and is identical with the "Left" valve 125 for the table. A solenoid 7SOL operates a valve 126' which controls the rapid traverse movement of the carrier and corresponds to the "Rapid" valve 126 for the table. A solenoid 8SOL is adapted to actuate a valve 127' which, when operated, permits the plunger of the rate valve 123' to move to the left to bring the roll into engagement with the cam for adjustment of the feed rate in accordance with the setting of a dial corresponding to the dial 181 (FIG. 7). The valve 127' corresponds in all respects with the valve 127 (FIG. 8), and when the solenoid 8SOL is deenergized, it causes a plunger corresponding to the plunger 173, to move the plunger of the rate valve 123' to the right to further restrict the flow of return fluid from the motor and reduce the feed rate of the carrier as necessary to effect an accurate stop.

In the present machine tool, means is provided for starting and stopping the spindle under the control of a valve 200 actuated by a solenoid 5SOL. This valve contains a spool 201 which, when the solenoid is deenergized, delivers fluid under pressure from the pilot pressure line 11 through a line 16 to a port on the spindle control mechanism. Fluid is returned from the latter mechanism through a line 27 which is connected by the valve 200 to the pilot exhaust line 4. When the solenoid 5SOL is energized, the spool 201 is shifted upward, and the connections of lines 11 and 4 to lines 16 and 27 are reversed.

The spindle control mechanism includes a shaft 202 which is journaled for rotation in the frame of the carrier 36 and has a pair of annular grooves machined therein which are arranged to lie in alignment with the ports to which lines 16 and 27 are connected. Each port is connected by a longitudinally extending hole in the shaft to a radial hole which is in alignment with a port formed in a sleeve 203 which is keyed to the shaft by a pin 204. The sleeve is provided with a flange 205 which lies between the ports and which is received in an internal groove formed in an annular piston 206. The ends of the piston are machined for a sliding fit on the sleeve 203 and the flange 205 is likewise machined for a sliding fit with the cylindrical face of the groove so that when hydraulic fluid is admitted through one port and exhausted through the other port, the piston will be driven along the sleeve.

Interposed between the ends of the piston and the frame of the carrier 36 is a series of brake discs 207, alternate discs of the series being keyed to the carrier frame 36 and the sleeve 203. At the other end of the piston is a series of clutch discs 208, alternate discs of the series being keyed to the sleeve and to a hub of a gear 209 which is journaled for rotation on the end of the sleeve. This gear is adapted to be driven by the spindle driving motor 40 through an appropriate drive train, while the spindle 37 is drivingly connected with a gear 210 fast on the shaft 202 through a conventional speed change gear set 211. Hence, when solenoid 5SOL is deenergized, the sleeve 203 and spindle 37 will be held against rotation by the clamping action of the piston 206 on the brake discs 207, and when solenoid 5SOL is energized, the sleeve will be clutched to the drive gear 209 and the spindle will be driven by the motor 40.

Program board

The automatic cycle control mechanism, which constitutes the subject matter of the present invention, includes a programming device whereby the operator may set up the machine for any desired type of automatic cycle in accordance with the requirements of the part being machined. For this purpose there is provided a program board shown in FIGS. 9, 10, and 11 which may be set up by the operator to cause the machine tool to perform its various functions in the proper sequence during the automatic cycle. This board includes a plate 215 which serves as a support for the elements comprising the program board and which also affords a means for mounting the board on the machine tool. The plate 215 has formed therein a plurality of elongated slots, each of which is adapted to receive a correspondingly shaped boss 216 (FIG. 10) formed on a contact block 217, thereby effecting a flush type mounting of the blocks on the plate. Each block is formed of insulating material and has embedded therein a common contact strip 218 which extends the full length of the block. The strip 218 is formed with a series of equally spaced scallops 219 (FIG. 11), and opposite each scallop there is embedded in the block an individual contact 220 having a head portion, which is curved to lie in a common circle with the adjacent scallop, and a tail portion 221 which projects from the rear of the block to form a terminal for the individual contact. The common contact strip 218 is also formed with a rearwardly projecting terminal (not shown) to permit electrical connection to be made therewith.

Each scallop 219, together with its associated individual contact 220, forms a receptacle or jack for receiving a banana plug 222 having a metal plug portion 223 which is received in an insulated handle 224. When the plug is inserted in one of the thus constituted jacks, as shown in FIG. 10, the individual contact 220 is electrically connected to the common contact strip 218 to effect the selection of a particular machine function as will be more clearly understood from a discussion of the wiring diagram to follow.

Each block 217 is provided with as many jacks as there are events, i.e., the number of jacks per block is equal to the number of possible events for each automatic cycle, and the mounting plate is provided with as many blocks as there are machine functions to be programmed. As shown in FIG. 9, the board is provided at its right hand side with legends indicating the machine functions controlled by the several blocks 21k and each vertical row of jacks are numbered along the bottom of the board to correspond with the numbering of the events in the cycle.

One possible setup of the program board is shown in FIG. 13 of the drawings where the small circles indicate the positioning of plugs 222 on the board. This arrangement of the plugs corresponds with the automatic cycle shown diagrammatically in FIG. 12. The directions herein indicated by the arrows, signifies the direction of the cutter relative to the work. In event #1, the table is moved to the left in rapid traverse off of a trip dog 227 (FIG. 1) and continues to point 2 where a trip dog 228 (FIG. 1) operates its associated limit switch 23LS to initiate event #2. In this event, "Tablet Left" and "Slow Feed" are programmed to move the table to point 3 (FIG. 12). Here a trip dog 229 (FIG. 1) operates its associated limit switch 24LS to terminate movement of the table and initiate event #3 in which "Carrier Down" and "Rapid" are programmed to cause rapid traverse of the cutter toward the work. In this event, and in all succeeding events through event #21, "Spindle" is programmed to cause rotation of the cutter. At point 4, a dog 230 (FIG. 5) on the carrier operates limit switch 12LS and initiates event #4 in which "Carrier Down" is programmed. The carrier now moves at a feed rate to point 5, a bypass position, where limit switch 14LS is operated by the dog 231 (FIG. 5) on the carrier to initiate event #5. This event is the same as event #4, and the carrier continues to move down at a feed rate. At point 6, another bypass position, a dog 232 on the carrier operates limit switch 13LS to initiate event #6 in which a dwell function is programmed along with "Carrier Down." Accordingly, when point 7 is reached, a dog 233 (FIG. 5) operates limit switch 12LS to stop downward movement of the carrier, and, after a dwell of approximately two seconds, which provides time for the cutter to clean out the cut at the end of the keyway, event #7 is initiated. In this event, "Table Left" and "Dwell" are programmed to move the table at a feed rate to the left until point 8 is reached where a dog 234 (FIG. 1) on the table operates limit switch 23LS to terminate movement of the table, and, after a two second dwell, event #8 is initiated. In this event, "Carrier Up" and "Rapid" are programmed to cause the carrier to move the tool up out of the cut. When point 9 is reached, a dog 235 (FIG. 6) on the carrier operates limit switch 11LS to terminate upward movement of the carrier and initiate event #9. The events are then repeated as before to cut the keyway 52 in the central portion of the shaft. In this case, however, downward movement of the carrier is terminated at point 13 (FIG. 12) with a dwell which was programmed in event #12. In the case of the last keyway 53 to be cut, a dog by-pass is indicated at point 19 which corresponds to the dog by-pass which occurred at point 5 for the first keyway 51. During event #21, "Carrier Up" and "Rapid" are programmed to cause the carrier to move up in rapid traverse until point 22 is reached, where the dog 235 on the carrier (FIG. 6) operates limit switch 11LS to terminate upward movement of the carrier and initiate event #22. In this event, "Table Right" and "Rapid" are programmed to return the table to the starting point. When point 23 is reached, the dog 227 (FIG. 1) on the table operates limit switch 21LS (FIG. 4) to initiate event #23 in which "Reset" is programmed to advance the stepping switch to its home position ready for the next automatic cycle.

*Wiring diagram*

The electrical control equipment of the machine tool is illustrated by the wiring diagram shown in FIGS. 14a to 14e, inclusive. In this diagram, the various control circuits are shown connected between a pair of energizing conductors extending vertically of the sheets and continuing from one sheet to the next. The horizontal lines in the diagram are identified by a series of index numbers located along the left margin of each sheet in order to provide a ready means for locating the contacts, limit switches, relays, and solenoids contained in the circuit. The functions of the relays and solenoids are indicated by the legends located at the right hand side of the drawings. The numbers located beneath the legends associated with the control relays indicate the horizontal lines in the diagram in which the contacts of the relays are located, the underscored numerals indicating normally closed contacts. The diodes used in the D.C. portion of the circuit are poled to indicate the direction of conventional current flow and are utilized for blocking and to prevent the occurrence of "sneak" circuits.

Power is supplied to the electrical circuits shown in FIGS. 14a to 14e by a transformer 250 (FIG. 14a) having a primary winding 251 and a secondary winding 252. The terminals of the primary winding may be connected to any suitable source of alternating current while the secondary winding is connected to conductors 253 and 254 which deliver alternating current to the circuits shown in FIG. 14a and to the regulated power supply 255 shown in FIG. 14b. With the circuit connections as shown herein, the power supply will be continuously energized so long as the primary winding of the transformer 250 is supplied with energy from the power source to which it is connected. The circuit is provided with a "Master Start" push button 256(7) which, together with a "Master Stop" push button 257, may be mounted on a control panel 258 (FIG. 1) attached to the housing 63 on the front of the machine. Depression of push button 256 will energize a relay 1CR(9) thereby closing the contacts of this relay in line 7 to energize a relay LEB. The latter relay is arranged to control the closing of contacts for initiating the operation of the spindle driving motor 40, previously described, and the motor for driving the hydraulic pump 117 shown in FIG. 8. The relay LEB has a pair of contacts shown in line 8 which are connected around the push button 256 so as to latch in the relays 1CR and LEB and maintain them energized until the push button 257 is depressed to stop the machine.

Depression of push button 256 energizes a lead 259 which, in turn, energizes the primary winding of a transformer 260 through a resistor 3R(19). Thereby a lamp 3LT connected to the terminals of the secondary winding of transformer 260 is caused to burn dimly as long as the relays 1CR and LEB are energized. The lamp 3LT forms a part of an event indicator which includes also a bank SS-1(15) of a stepping switch SS(139) and a manually positionable selector switch 261 which may be mounted on the bottom of the program board as shown in FIG. 9. Should the automatic cycle be interrupted in a manner hereinafter to be described, the event in which the machine has stopped may be determined by rotating the switch 261 until the lamp 3LT burns brightly, thereby indicating that the wiper of switch 261 is on the same stud as the wiper of the stepping switch for the bank SS-1. This results from the fact that the contact studs of the switch 261 and the stepping switch bank are connected by jumpers 262 thereby shorting out the resistor 3R and causing the lamp to burn brightly when the switch 261 is set to the event corresponding to the setting of the stepping switch.

Figure 14B:
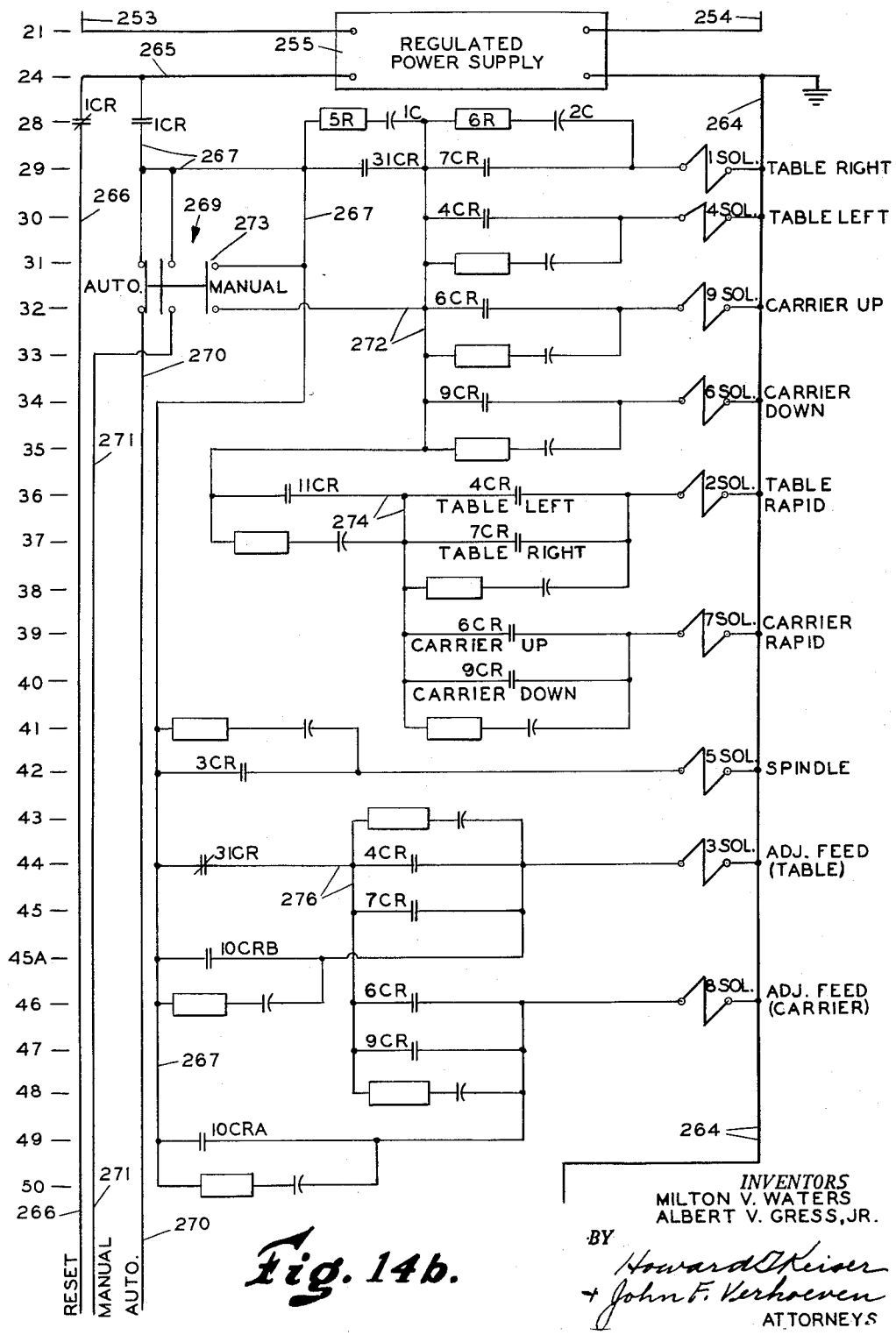
Figure 14D:
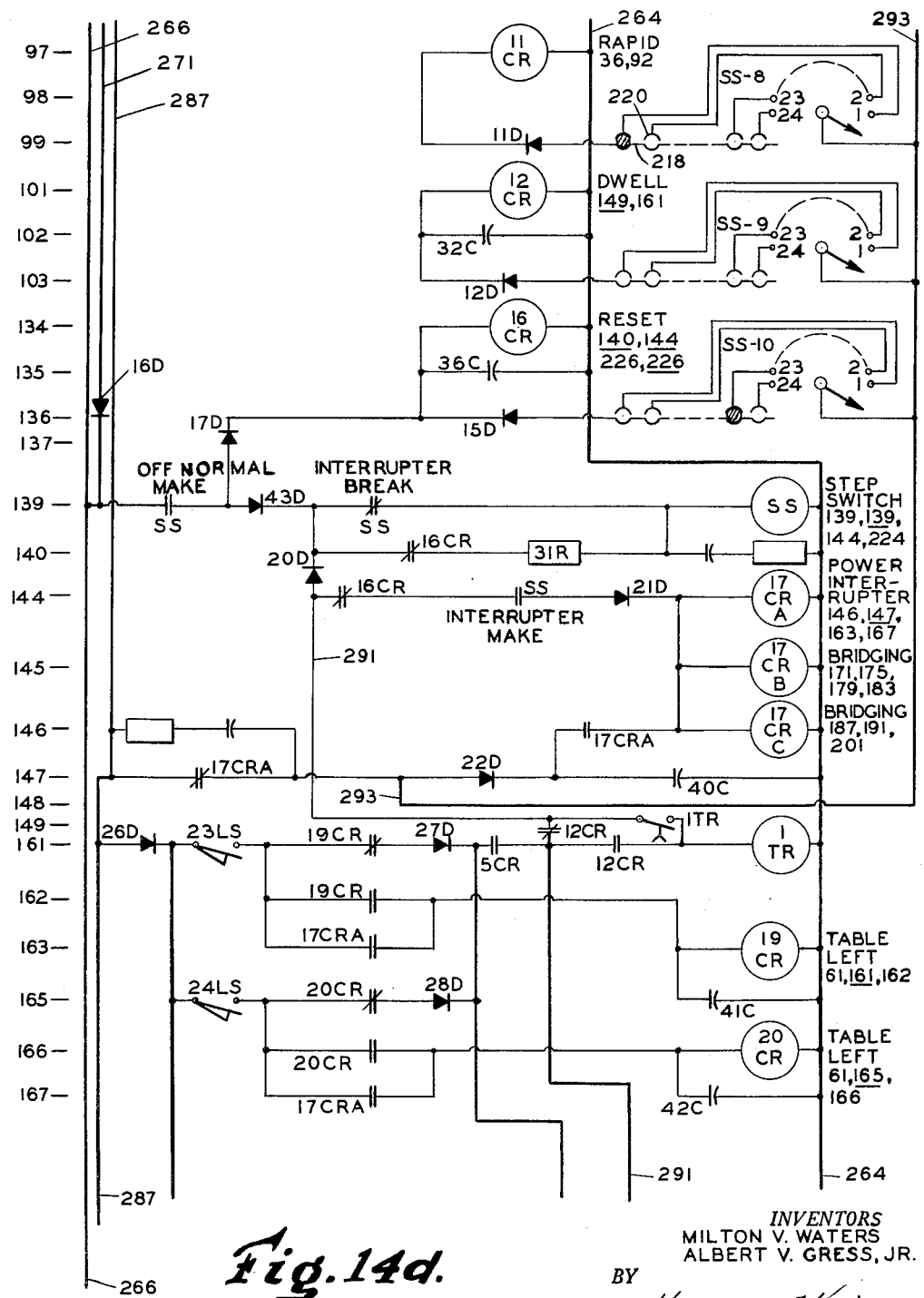
Figure 14E:
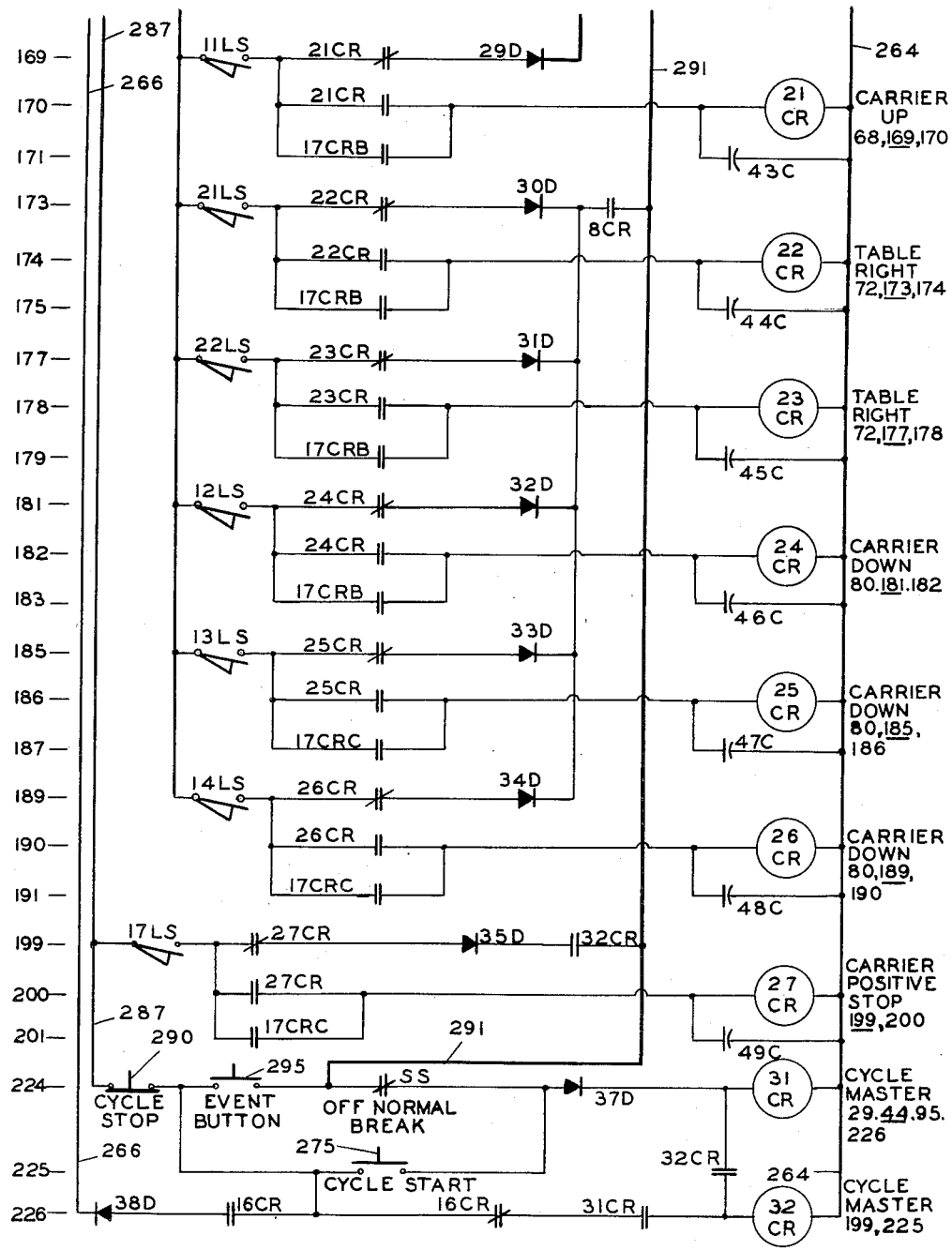

The regulated D.C. output of the power supply 255 is connected to conductors 264 and 265 as shown in FIG. 14b. The negative terminal of the supply is preferably connected to conductor 264 which may be grounded as shown, while the positive terminal is preferably connected to the conductor 265. The output voltage of the power supply in the present embodiment of the invention is 48 volts, D.C., this being a convenient voltage for use with the control circuits herein utilized. The positive conductor is arranged to be connected either through the normally closed contacts (28) of relay 1CR with a conductor 266 which is designated as the "Reset" line, or, alternatively, through the normally open contacts (28) of this same relay with a conductor 267. The conductor 267 may, in turn, be selectively connected by a switch 269 with a conductor 270 designated as the "Automatic Cycle" line, or, alternatively, with a conductor 271, designated as the "Manual" line. The switch 269, which may be mounted on the control panel 258 (FIG. 1), is shown in FIG. 14b in its "Auto" position in which the conductor 270 is connected with the conductor 267 for energization thereby when the relay 1CR is energized.

Inasmuch as the control circuits shown in FIGS. 14b–14e are energized by D.C. current delivered by the power supply 255, resistor-capacitor combinations such as 5R—1C(28) and 6R—2C(28) are shunted across the relay contacts such as 31CR and 7CR for arc suppression. In the remainder of the wiring diagram, these components are not designated by number where used for this purpose since their function is readily apparent and since this feature does not form a part of the present invention.

The solenoids 1SOL—9SOL, heretofore discussed in connection with the hydraulic diagram (FIG. 8), are shown in FIG. 14b together with the circuits for energizing the same. Each solenoid has one terminal connected to the common conductor 264 while the other terminal is connected through appropriate relay contacts with the conductor 267, thereby providing a path for current flow through the solenoids from the positive terminal of the power supply to the negative terminal thereof. When the switch 269 is set to the "Manual" position, a conductor 272 is connected to the conductor 267 through the contacts 273 of the switch. Hence, when the contacts 7CR(29), 4CR(30), 6CR(32), or 9CR(34) of the corresponding control relays shown in FIG. 14c are closed, the solenoids 1SOL, 4SOL, 9SOL, or 6SOL will be energized and cause the table to be moved right or left or the carrier to be moved up or down. When the contacts 11CR(36) of a control relay 11CR(97) are closed, a conductor 274 will be connected to the conductor 272 and cause either solenoid 2SOL to be energized through the contacts 4CR(36) or 7CR(37), or solenoid 7SOL to be energized through the contacts 6CR(39), or 9CR(40) to cause rapid traverse of the table or carrier in the appropriate direction.

When the switch 269 is in the "Auto" position, the conductor 267 may be connected to the conductor 272 by the closure of contacts 31CR(29), and the energization of the solenoids will be controlled as above described. As will hereinafter be described, the contacts 31CR in line 29 will be closed by depression of a "Cycle Start" push button 275(225) which causes relay 31CR(224) to be energized.

The energizing circuits for the solenoids 5SOL, 3SOL, and 8SOL are independent of the switch 269 since these circuits are all connected directly across the conductors 267 and 264. Hence, when relay 3CR(55) is energized to close the contacts 3CR in line 42, solenoid 5SOL will be energized to clutch the spindle 37 to its power source and cause the cutter to rotate. If switch 269 is set to "Manual," the "Automatic Cycle" line 270 will be deenergized, thereby deenergizing relay 31CR and causing its contacts in line 44 to be closed to connect a conductor 276 to the conductor 267. Hence, whenever relay contacts 4CR(44), 6CR(45), 7CR(46), or 9CR(47), are closed, solenoid 3SOL or 8SOL will be energized to cause adjustable feed of the carrier or table. Similarly, when the switch 269 is set in the "Auto" position and the "Cycle Start" push button 275 is depressed to energize relay 31CR, thereby opening its contacts in line 44, the solenoids 3SOL and 8SOL may be energized by energization of relays 10CRA and 10CRB(90, 91) to close the contacts 10CRA(39) and 10CRB(45A).

Continuous or programmed operation of the spindle 37 is controlled by a switch 280(57) which may be mounted on the control panel 258 (FIG. 1). When this switch is in its "Off" position, as shown in FIG. 14c, the spindle will be stopped and automatic cycling will be prevented by the open contacts 281 of the switch. When the switch is moved to the "Continuous" position, the conductor 271 will be connected to a conductor 282 thereby energizing relay 3CR(55) and solenoid 5SOL to drive the spindle in a continuous manner. The table and carrier may be operated manually in adjustable feed only by depression of push buttons 283(59), 284(69), 285(65), or 286(76), which serve to energize relays 4CR(60), 7CR(69), 6CR(65), or 9CR(76), and thereby solenoids 4SOL, 1SOL, 9SOL, or 6SOL, so long as the push buttons are held depressed. When the switch 280 is moved to the "Auto" position, a conductor 287 will be connected to the conductor 270 and thereby extend the automatic cycle line from line 57 to line 224. Relay 3CR can now be energized to start the spindle only by programming this function on the program board.

With switches 269 and 280 set to "Auto," an automatic cycle is initiated by depression of the "Cycle Start" push button 275(225) mounted on the control panel 258 which will connect the conductor 287 through a diode 37D(224) to the control relay 31CR and energize this relay. The relay 31CR has a pair of normally open contacts in line 226 which will thereby be closed and energize a control relay 32CR through the normal closed contacts 16CR in line 226. Energization of relay 32CR will cause its contacts in line 225 to close, thereby establishing a holding circuit for the relay 31CR around the contacts of the "Cycle Start" push button. The automatic cycle may be interrupted at any time during the cycle by depressing a "Cycle Stop" push button 290(224) also mounted on the control panel.

Depression of the "Cycle Start" push button also serves to connect the conductor 287 with a pulse line 291 through the Off Normal Break contacts (224) of stepping switch SS(139) which are closed when the stepping switch is in its normal home position. The stepping switch is a commercially available item of known construction having a plurality of banks of individual contacts, there being 26 contacts in each bank in the stepping switch herein utilized, and as many banks as there are functions to be programmed. In the present circuit arrangement ten banks of contacts are utilized, these banks being designated at SS–1, SS–2 . . . SS–10. The contacts of each bank are circularly arranged and adapted to be contacted one after another in succession by a rotary wiper such as the wiper 292 shown in connection with bank SS–1(15). The stepping switch is provided with a 24 volt solenoid which, when energized, cocks a spring that acts to advance the wiper to the next contact when the solenoid is deenergized. Also, when the solenoid is energized, the Interrupter Make contacts (144) are closed, and the Interrupter Break contacts (139) are opened. When the wipers are in their home positions, the ONB contacts (224) are closed, and the ONM contacts (139) are open. When the wipers are moved away from home position, the ONB contacts are open, and the ONM contacts are closed and remain in this condition until the wipers have been stepped as required to bring them back to home position.

When the pulse line 291 is connected by the "Cycle Start" push button to the conductor 287, positive voltage is applied through the normally closed contacts 12CR(149), diode 20D and the IB contacts (139) to the solenoid of the stepping switch SS. The solenoid is energized with 48 volts from the power supply and the IB contacts in line 139 open to insert the resistor 31R in series with the solenoid of the stepping switch to reduce the voltage to the normal voltage rating of the solenoid. When the "Cycle Start" push button is released, the pulse line is disconnected from conductor 287 and the stepping switch is deenergized, thereby stepping the wipers of all banks ahead to engage the #1 contacts of their associated banks. The ONB contacts (224) will then open and remain open during the cycle to prevent energization of the pulse line by depression of the "Cycle Start" push button when the stepping switch is in an off normal position.

When the stepping switch is energized through the pulse line, the IM contacts (144) are closed, thereby connecting positive voltage from the pulse line through normally closed contacts 16CR(144) and a diode 21D to a group of relays 17CRA, 17CRB, and 17CRC hereinafter referred to generally as relays 17CR. The relays are thus energized and remain energized only so long as the stepping switch is "cocked." The relay 17CRA has a pair of normally closed contacts in line 147 which serve to connect a conductor 293 running to the wipers of all banks except SS–1 and SS–7 with the positive voltage supplied to the automatic cycle line 287. At the same time a capacitor 40C(147) is connected across the coils of relays 17CR by the contacts 17CRA(146) to delay the dropout of the relays after the IM contacts (144) open. The closing of contacts 17CRA in line 147 is thereby delayed until after the wipers of stepping switch SS have stepped to the next set of contacts so that there can be no arcing across the contacts of the stepping switch banks.

As indicated herein, the individual contacts of each of the stepping switch banks SS–2 to SS–10 are connected with the individual contacts 220 (FIG. 11) in each of the blocks 217 of the program board. The common contact strip 218 of each block is thereby selectively connected with the positive voltage source by the presence of a plug in the board. For example, if when the wipers are stepped to the #1 contacts, there are plugs inserted in the board for "Table Left" and "Rapid" in event #1, the presence of such plugs will cause positive voltage to be connected to the common contact strip 218(61) associated with the "Table Left" function, and also to the common contact strip 218(99) associated with the "Rapid" function. Thereby relay 4CR(60) will be energized through diode 3D and limit switches 24LS and 23LS, and relay 11CR(97) will be energized through diode 11D. Selector relay 5CR(63) will also be energized at this time through a diode 4D(62). The table will then move in rapid traverse to the left until limit switch 23LS(60) is operated by a trip dog such as dog 228 (FIG. 1) to break the energizing circuit for relay 4CR. Also, of course, the same result could be achieved by causing limit switch 24LS to be operated by a suitable trip dog. At the same instant, the normally open contacts of limit switch 23LS in line 161 will be closed, thereby connecting conductor 287 through a diode 26D, normally closed contacts 19CR, diode 27D, and the now closed contacts to relay 5CR with the pulse line 291. Thereby, the stepping switch SS is pulsed and relay 17CRA is energized to close its contacts in line 163. Relay 19CR is thereby energized and opens its contacts in line 161 to deenergize the pulse line and the stepping switch. At the same time, the contacts 19CR in line 162 are closed to establish a holding circuit for relay 19CR around the 17CRA contacts, so that it will remain energized so long as the contacts of limit switch 23LS in line 161 are held closed. The contacts 19CR in line 61 are also closed to bridge the contacts of limit switch 23LS in line 60 and permit continued movement of the table to the left if such movement is programmed in the next event. Thus, in the case of the by-pass of a dog, table movement will continue without interruption past the dog. When the limit switch 23LS is released by the trip dog, relay 19CR is held energized by the discharge of a capacitor 41C(165) through the relay coil until after the contacts of limit switch 23LS in line 60 have closed, thereby preventing a hesitation in the motion of the table caused by the momentary dropout of relay 4CR. A similar provision is made in the case of the table right limit switches 21LS and 22LS(71) and also in the case of the carrier up limit switch 11LS(67) and the carrier down limit switches 12LS, 13LS, and 14LS(79). The energizing circuits for relays 20CR to 27CR, inclusive, are all similar to the one just described for relay 19CR. A plurality of limit switches are provided for controlling the table right or left and the carrier down movements so as to permit close spacing of the trip dogs where this is required by the nature of the part being machined.

It is to be noted that the relays 17CR, together with their contacts in lines 163, 167, 171, 175, 179, 183, 187, 191, and 201, form part of a "proving" circuit which insures that the stepping switch SS is cocked each time a limit switch, such as 23LS, is operated by a trip dog. In other words, unless the stepping switch is cocked and the 1M contacts in line 144 are closed to energize relays 17CR, the control relays, such as relay 19CR, cannot be energized to deenergize the pulse line and cause the stepping switch to advance and, at the same time, close the contacts 19CR in line 61 to bridge around the limit switch contacts 23LS in line 60 to establish an energizing circuit for relay 4CR. Hence, if for some reason, the stepping switch is not cocked when the limit switch is operated, the slide will stop and will remain at rest until the trouble is cleared.

It will also be observed that in the case of the multiple limit switches provided for the table right and left and carrier down movements, proper operation may be secured with the spacing of the trip dogs so close that one limit switch remains depressed when the next limit switch is operated. In other words, in the case of the table, both table right or table left limit switches may be held depressed and proper sequencing obtained so long as one limit switch is operated ahead of the other. This results from the presence of the bridging contacts 19CR and 20CR in line 61, and 22CR and 23CR in line 72. In the case of the carrier down limit switches, all three of these may be held depressed at one time without adverse effect upon the cycling of the machine from one event to the next so long as the limit switches are operated in succession. The bridging contacts 24CR, 25CR, and 26CR in line 80 enable continued movement of the carrier even though the trip dogs remain on the limit switches.

The selector relays 5CR(63) and 8CR(74) have contacts in lines 161 and 173 respectively, which serve to prevent the limit switches operated by the table left and carrier up dogs from energizing the pulse line 291 when the table is moving to the right or the carrier is moving down, and vice versa.

Each time the line 291 is pulsed, the relay 17CRA is momentarily energized to remove power from the conductor 293 which is connected to the wipers of the stepping switch banks. Hence, during stepping of the switch from one event to the other, power is removed from the control relays until capacitor 40C discharges through the windings of relays 17CR. These relays drop out then thereby restoring power to the conductor 293 to initiate the next event.

The slow feed function for both the table and the carrier is controlled by a pair of relays 10CRA and 10CRB(90, 91) which are normally energized through a voltage dropping resistor 28R(90). When slow feed is programmed, the wiper of the bank SS–7(92), which is connected to the right hand end of resistor 28R through the 31CR contacts in line 95, will be electrically connected to the common contact strip 218 which is joined to the conductor 264. Hence, the relays 10CR will be shorted out, and the power supply voltage will be dropped across the resistor. When relays 10CR are deenergized, the contacts 10CRA and 10CRB in lines 49 and 45A will be open thereby deenergizing solenoids 3SOL and 8SOL. Hence, the rate valves for the table and carrier will be conditioned for slow feed.

As shown in FIG. 14c, capacitors 25C(59), 27C(67), 28C(71), and 30C(78) are effectively shunted across the coils of relays 4CR, 6CR, 7CR, and 9CR when the contacts of relays 10CRA and 10CRB in lines 59, 67, 71 and 78 are closed. Thus, the capacitors, which are charged when the relays are energized, will discharge through the relay coils and delay the dropout of the relays when the table or carrier is being moved in adjustable feed. This is useful when the bypass of a trip dog is required since the delay provided by the capacitors is sufficient to hold the relays energized during the stepping of the stepping switch SS to the next event and hesitation of the slide is avoided. However, when slow feed is programmed to effect an accurate stop of the slide, the relays 10CR are deenergized and their contacts in lines 59, 67, 71, and 78 are opened, thereby disconnecting the capacitors and causing prompt drop out of the relays when the limit switches are opened.

Slow feed is automatically programmed with "Rapid" by the presence of contact 11CR in line 92. Therefore, whenever relay 11CR is energized during an event, relays 10CR are deenergized and solenoids 3SOL and 8SOL are likewise deenergized to condition the rate valves associated with the table and carrier for slow feed. Since the Table Rapid and Carrier Rapid solenoids 2SOL and 7SOL are energized by closure of contacts 11CR in line 36, the rate valves will be by-passed. However, since the relays 10CR are deenergized and their contacts in lines 59, 67, 71 and 78 are open, the capacitors 25C, 27C, 28C and 30C will be disconnected and permit prompt deenergization of the table and carrier relays when the limit switches are operated. This feature is provided to prevent the table or carrier from overrunning the trip dog in rapid traverse.

When a dwell function is programmed, a relay 12CR(101) will be energized, thereby opening the contacts 12CR in line 149 and closing the contacts 12CR in line 161. Hence, when the pulse line 291 is energized, a timer relay 1TR(161) will be energized and cause the time delay contacts 1TR in line 149 to close after a suitable time delay which may, for example, be in the neighborhood of two seconds. A circuit will thereby be provided around the open contacts of relay 12CR in line 149, and the stepping switch will be energized and stepped to the next event. A dwell is often necessary at the beginning or end of a cut to clean up the work before the cutter moves on, and it has special utility in the case of the positive stop provided in the present machine tool for stopping the carrier in a precise position. In this case, the limit switch 17LS (199 and FIG. 2) is operated just before the carrier engages the positive stop and the delay provided by the dwell gives the carrier motor time to drive the slide firmly against the stop and hold it there before the event is terminated and the next one begun.

Provision is made in the present system for resetting the stepping switch SS to its normal position at the conclusion of each automatic cycle so as to prepare the machine for the next cycle. This is accomplished by programming a reset function as a last event in the cycle which may, for example, be assumed to be event #23. Accordingly, when the wiper of the bank SS-10 reaches the 23rd contact in the bank, relay 16CR will be energized, thereby opening its normally closed contacts in line 226. This will cause relays 31CR and 32CR to be deenergized and disable the table and carrier movement under the control of the solenoids as shown in FIG. 14b. Closure of the normally open contacts 16CR in line 226 will connect conductor 287 to the reset line 266 and provide a holding circuit for relay 16CR through the closed ONM contacts (139) and the diode 17D(137). The normally closed contacts 16CR in line 140 will open and break and shunt path around the 1B contacts in line 139, so that the stepping switch will continue to step until it reaches its home position when the ONM contacts (139) will open and break the energizing circuit for the stepping switch SS and relay 16CR.

Resetting of the stepping switch will also take place if the switch 269(32) is set to "Manual" with the stepping switch off normal. In this case, the conductor 271 will be connected to the positive side of the power supply and will energize stepping switch SS and relay 16CR through a diode 16D(136), thereby causing resetting operation of the stepping switch as before.

When the "Master Stop" push button 257(7) is depressed with the stepping switch in an off normal position, the stepping switch will be reset in the following manner: Relay 1CR will be deenergized and its contacts in line 28 will close to connect the reset line 266 to the positive side of the power supply. Relay 16CR and stepping switch SS will thereby be energized through the ONM contacts (139) as previously described to reset the stepping switch to normal position.

Also, in the event of a power failure, resetting will take place since relay 1CR will be deenergized and connect the reset line 266 to the positive side of the power supply. The filter capacitors in the power supply will then discharge through the coils of stepping switch SS and relay 16CR to cause resetting of the stepping switch in the manner previously described. If the filter capacitors are not sufficiently charged to complete resetting of the stepping switch, the resetting will be completed after power is restored since relay 1CR will be deenergized.

When the machine tool is operating in automatic cycle and for any reason it is desired to stop the cycle, the "Cycle Stop" push button 290(224) may be depressed, thereby deenergizing the automatic cycle relays 31CR and 32CR and stopping the machine without resetting the stepping switch. Deenergization of relay 31CR will cause its contacts in line 29 to open, thereby deenergizing the table and carrier solenoids and stopping further movement of the slides. Automatic cycling may be reinitiated by depressing the "Cycle Start" push button 275. The relays 31CR and 32CR will again be picked up to continue the cycle from the point where it left off. The stepping switch will not be pulsed at this time since the ONB contacts in line 224 are open.

If at any time it is necessary to advance the stepping switch through one or more events, the "Event Button" 295(224) mounted on the bottom of the program board (FIG. 9) may be depressed, thereby pulsing the stepping switch once for each depression of the push button 295. For example, if the cycle has been interrupted, or if the stepping switch is in its normal or home position, and it is desired to set the cycle ahead, for example, to event #15 the selector switch 261 (15 and FIG. 9) may be set to 15 and the "Event Button" 295 operated until the lamp 3LT burns brightly thereby indicating that the stepping switch has been advanced to event #15. The cycle may be commenced at this point by depressing the "Cycle Start" push button to pull in relays 31CR and 32CR and start the automatic cycle.

The mode of operation of the machine tool both in manual and in automatic cycle should now be clear from the foregoing description of the wiring diagram when considered in conjunction with the diagram of the cycle shown in FIG. 12 and the program board set up shown in FIG. 13. While the invention has been described in connection with a specific example of work, it will be readily apparent that the automatic cycle can be programmed to suit other types of milling operations, and that it could also be applied with equally satisfactory results to any machine tool which follows an invariable cycle of events in the machining of a plurality of work pieces. It will, therefore, be appreciated that the present disclosure is illustrative rather than restrictive and that changes and modifications may be resorted to without departing from the spirit of the invention as defined by the claims which follow.

What is claimed is:

1. In an apparatus for programming a machine tool through an automatic cycle consisting of a plurality of sequentially ordered events, said machine tool having a bed, a machine element supported for movement on said bed, and means for driving said element, the invention comprising a plurality of machine tool function determining circuits for controlling said driving means, a source of energizing potential, a programming device for determining the sequence of machine tool functions during the automatic cycle, a stepping switch having a cocking stroke and an advancing stroke for selectively connecting said function determining circuits to said source in the order determined by said programming device, a trip dog on said machine element, means including a limit switch mounted on said bed for operation by said trip dog, said limit switch having one pair of contacts which are effective to disconnect the function determining circuit selected by said stepping switch from said source and a second pair of contacts which are effective to connect said stepping switch to said source for cocking thereof, and means rendered effective upon cocking of said stepping switch to bridge said one pair of contacts and thereby render said latter contacts ineffective to disconnect said function determining circuit.

2. The apparatus of claim 1 including a pair of interrupter contacts on said stepping switch, and relay means controlled by said interrupter contacts for disconnecting all of said function determining circuits from said source and for rendering said second pair of contacts ineffective whereupon said stepping switch will be deenergized and advanced to select the next event.

3. The apparatus of claim 2 including delay means for maintaining said function determining circuits disconnected from said source until the selection of the next event by said stepping switch has been completed.

4. The apparatus of claim 3 including means controlled by said relay means for bridging said one pair of contacts of said limit switch to render said latter contacts ineffective to disconnect said function determining circuit from said source.

5. In an apparatus for programming a machine tool through an automatic cycle consisting of a plurality of sequentially ordered events, said machine tool having a bed, a machine element supported for movement on said bed, and means for driving said element, the invention comprising means including a plurality of function determining circuits for controlling said driving means, a source of energizing potential, means including a stepping switch having a cocking stroke and an advancing stroke for selectively connecting one of said circuits to said source, means for disconnecting the circuit selected by said stepping switch from said source and for connecting said stepping switch to said source, said means including a trip dog on said element, a limit switch mounted on said bed for operation by said trip dog, a first pair of contacts on said limit switch for disconnecting the selected function determining circuit from said source, and a second pair of contacts for connecting said stepping switch to said source to cock the same, a first relay, means including a pair of interrupter contacts on said stepping switch for energizing said first relay when said stepping switch is cocked, means rendered effective by the energization of said first relay for disabling all of said functioning determining circuits, a second relay, means rendered effective upon energization of the first relay for energizing said second relay, and means controlled by said second relay for disconnecting said stepping switch from said source whereupon said stepping switch will be energized and advanced to select the next event and deenergize said first relay.

6. The apparatus of claim 5 including a holding circuit for maintaining said second relay energized through said second pair of contacts of said limit switch.

7. The apparatus of claim 6 including means controlled by said second relay for bridging said first pair of contacts of said limit switch during the time that said second relay is energized.

8. The apparatus of claim 7 including delay means for maintaining said second relay energized for a predetermined time interval after said holding circuit is broken by movement of said trip dog off of said limit switch.

9. In an apparatus for programming a machine tool through an automatic cycle consisting of a plurality of sequentially ordered events, said machine having a bed, a machine element supported for movement on said bed, and means for driving said element, the invention comprising means including a plurality of function determining relays for controlling said driving means, a source of energizing potential, means including a stepping switch for selectively connecting one of said relays to said source for energization thereby, means for disconnecting the relay selected by said stepping switch from said source and for connecting said stepping switch to said source, said means including a trip dog on said element, a limit switch mounted on said bed for operation by said trip dog, a first pair of contacts on said limit switch for disconnecting the selected function determining relay from said source, and a second pair of contacts for connecting said stepping switch to said source, and delay means for maintaining said selected relay energized for a predetermined time interval after said relay is disconnected from said source.

10. The apparatus of claim 9 including a normally energized control relay, a circuit adapted to be selected by said stepping switch in conjunction with the selected functioning determining relay, for deenergizing said control relay, and means rendered effective upon the deenergization of said control relay for disabling said delay means to effect prompt deenergization of said selected functioning determining relay when it is disconnected from said source.

11. In an apparatus for programming a machine tool through an automatic cycle consisting of a plurality of sequentially ordered events, said machine tool having a bed, a machine element supported for movement on said bed, and means for driving said element, the invention comprising means including a plurality of functioning determining circuits for controlling said driving means, a source of energizing potential, means including a stepping switch for selectively connecting one of said circuits to said source, said switch having a pair of off normal make contacts and a pair of interrupter break contacts, a trip dog on said element, means including a limit switch mounted on said bed for operation by said trip dog to connect said stepping switch to said source for energization thereby, means for automatically disconnecting said stepping switch from said source to cause it to advance and select the next event in the automatic cycle, a resetting relay adapted to be selectively connected to said source by said stepping switch, and a pair of normally open contacts actuated by said resetting relay for connecting said stepping switch to said source through said off normal make contacts and said interrupter break contacts to thereby step said switch to home position.

12. The apparatus of claim 11 including a holding circuit for maintaining said resetting relay energized until the stepping switch reaches its home position, said holding circuit including said off normal make contacts of said stepping switch.

13. In an apparatus for programming a machine tool through an automatic cycle consisting of a plurality of sequentially ordered events, said machine tool having a bed, a machine element supported for movement on said bed, and means for driving said element, the invention comprising means, including a plurality of function determining circuits for controlling said driving means, a source of energizing potential, a pair of conductors, means for selectively connecting one or the other of said conductors to said source, means including a stepping switch for selectively connecting said circuits to one of said conductors for energization thereby, said switch having a pair of off normal make contacts and a pair of interrupter break contacts, means responsive to the movement of said machine element for connecting said stepping switch to said one conductor for energization thereby, means for automatically disconnecting said stepping switch from said one conductor to cause it to advance and select the next event in the automatic cycle, and a circuit connecting said stepping switch to said other conductor through said off normal make contacts and said interrupter break contact to cause said stepping switch to be advanced to home position when said other conductor is connected to said source.

14. The apparatus of claim 13 including manipulative means for selectively connecting any one of said function determining circuits to said other conductor for energization thereby.

15. In an apparatus for programming a machine tool through an automatic cycle consisting of a plurality of sequentially ordered events, said machine tool having a bed, a machine element supported for movement on said bed, and means for driving said element, the invention comprising a plurality of machine tool function determining circuits for controlling said driving means, a source of energizing potential, a programming device for determining the sequence of machine tool functions during the automatic cycle, a stepping switch having a cocking stroke and an advancing stroke for selectively connecting said function determining circuits to said source in the order determined by said programming device, a trip dog on said machine element, means including a limit switch mounted on said bed for operation by said trip dog, said limit switch having one pair of contacts which are effective to disconnect the function determining circuit selected by said stepping switch from said source and a second pair of contacts which are effective to connect said stepping switch to said source for cocking thereof.

16. In an apparatus for programming a machine tool through an automatic cycle consisting of a plurality of sequentially ordered events, said machine tool having a support, a machine element mounted on the support for movement relative thereto, and means for moving said element on the support, the combination of a plurality of function determining circuits for controlling said moving means, a source of energizing potential, means including an electrically operable device for selectively connecting said circuits to said source, a trip dog on said machine element, and means including a switch mounted on said support for operation by said trip dog, said switch having one pair of contacts which are effective to disconnect the function determining circuit selected by said device from said source and a second pair of contacts which are effective to connect said device to said source and thereby initiate the next selection of a function determining circuit.

References Cited in the file of this patent

UNITED STATES PATENTS

| | | |
|---|---|---|
| 2,427,493 | Bullard | Sept. 16, 1947 |
| 2,677,285 | Volk | May 4, 1954 |
| 2,838,963 | Good et al. | June 17, 1958 |